(12) United States Patent
Huo et al.

(10) Patent No.: US 11,812,057 B2
(45) Date of Patent: Nov. 7, 2023

(54) INTRA PREDICTION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN);
Yanzhuo Ma, Guangdong (CN);
Fuzheng Yang, Guangdong (CN);
Shuai Wan, Guangdong (CN); Xiaoyan Chai, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/365,869

(22) Filed: Jul. 1, 2021

(65) Prior Publication Data
US 2021/0329297 A1 Oct. 21, 2021

Related U.S. Application Data

(63) Continuation of application No. PCT/CN2019/070155, filed on Jan. 2, 2019.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11); *H04N 19/136* (2014.11); *H04N 19/176* (2014.11)

(58) Field of Classification Search
CPC .. H04N 19/117; H04N 19/105; H04N 19/159; H04N 19/176; H04N 19/59; H04N 19/82; H04N 19/593; H04N 19/11
See application file for complete search history.

(56) References Cited

U.S. PATENT DOCUMENTS 10,382,772 B1 *  8/2019  Zhao ..................... H04N 19/44
10,404,980 B1 *  9/2019  Zhao ..................... H04N 19/593
(Continued)

FOREIGN PATENT DOCUMENTS

CN   107071416 A   8/2017
CN   107155108 A   9/2017
(Continued)

OTHER PUBLICATIONS

Xiaoxiaochai. "Non-official translation: Wide Angle Intra Prediction (WAIP) for H.266 Intra Technology", https://blog.csdn.net/cxy19931018/article/details/83832558, Nov. 7, 2018 (Nov. 7, 2018), p. 1.
(Continued)

*Primary Examiner* — Francis Geroleo
(74) *Attorney, Agent, or Firm* — PERKINS COIE LLP

(57) ABSTRACT

An intra prediction method and device and a computer storage medium are provided. The intra prediction method includes that: a width-to-height radio of a present coding block and a width-to-height radio of a reference block are acquired, the reference block being a coding block correlated with the present coding block (S101); when the width-to-height radio of the present coding block is different from the width-to-height radio of the reference block, an angular replacement prediction mode corresponding to the reference block is adjusted to obtain a adjusted angular replacement prediction mode, the angular replacement prediction mode being an extended angular prediction mode under a wide-angle mode (S102); and a prediction mode list of the present
(Continued)

coding block is constructed based on the adjusted angular replacement prediction mode for intra prediction of the present coding block (S103).

12 Claims, 8 Drawing Sheets

(51) Int. Cl.
*H04N 19/11* (2014.01)
*H04N 19/136* (2014.01)
*H04N 19/176* (2014.01)

(56) References Cited

U.S. PATENT DOCUMENTS

| | | | |
|---|---|---|---|
| 2013/0287094 | A1 | 10/2013 | Song et al. |
| 2017/0272745 | A1 | 9/2017 | Liu et al. |
| 2018/0176601 | A1 | 6/2018 | Jeong et al. |
| 2018/0255299 | A1 | 9/2018 | Lee et al. |
| 2019/0141319 | A1 | 5/2019 | Moon et al. |
| 2019/0174128 | A1 | 6/2019 | Jang et al. |
| 2020/0007860 | A1* | 1/2020 | Zhao .................... H04N 19/176 |
| 2021/0037259 | A1* | 2/2021 | Ko ....................... H04N 19/463 |
| 2021/0250577 | A1* | 8/2021 | Leleannec ............ H04N 19/147 |

FOREIGN PATENT DOCUMENTS

| | | |
|---|---|---|
| CN | 108353185 A | 7/2018 |
| CN | 109040754 A | 12/2018 |
| EP | 3343926 A1 | 7/2018 |
| EP | 3451667 A2 | 3/2019 |
| JP | 2013150178 A | 8/2013 |
| JP | 2021515491 A | 6/2021 |
| WO | 2017188780 A2 | 11/2017 |
| WO | 2018030599 A1 | 2/2018 |
| WO | 2018117891 A1 | 6/2018 |
| WO | 2018127624 A1 | 7/2018 |
| WO | 2020009870 A1 | 1/2020 |

OTHER PUBLICATIONS

International Search Report in the international application No. PCT/CN2019/070155, dated Sep. 27, 2019.
Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r4; Title: CE3-related: Wide-angle intra prediction for non-square blocks.
Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0279; Title: CE3-related: Unification of angular intra prediction for square and non-square blocks.
Examination Report for Indian application No. 202127030757 dated Mar. 10, 2022. 6 pages with English translation.
JVET, "Test Model 2 of Versatile Video Coding (VTM 2)", Joint Video Experts Team (JVET) of ITU-T SG 16 WP 3 and ISO/IEC JTC I/SC 29/WG 11 JVET-K1002-v2, Ljubljana, SI, Jul. 10-18, 2018. 22 pages.
Racape, F., et al. (Technicolor) "CE3-related: Wide-angle intra prediction for non-square blocks", 11. JVET Meeting; Jul. 11-18, 2018; Ljubljana; (JVET of ISO/IEC JTC1/SC29/WG11 and ITU-TSG.16 ),No. JVET-K0500, XP030199961. 7 pages.
Supplementary European Search Report in European application No. 19907163.0, dated Apr. 29, 2022. 12 pages.
Zhao Jin et al. "A fast mode decision algorithm for intra prediction of H. 264", Journal of Yanshan University, vol. 34 No. 1, Jan. 2010, 1007-791X(2010)01-0056-05. 11 pages with English translation.
First Office Action of the Chinese application No. 202110976399.7, dated Dec. 19, 2022. 11 pages with English translation.
First Office Action of the European application No. 19907163.0, dated Jan. 23, 2023. 7 pages.
First Office Action of the Japanese application No. 2021-538791, dated Feb. 21, 2023. 10 pages with English translation.
Oral Examination of the European application No. 19907163.0, dated Jul. 24, 2023. 8 pages.
Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-v11, Title: Versatile Video Coding (Draft 3), Author(s) or Contact(s): Benjamin Bross, Jianle Chen, Shan Liu. pp. 70-74. 225 pages.
Second Office Action of the Japanese application No. 2021-538791, dated Aug. 25, 2023. 6 pages with English translation.
Hearing Notice of the Indian application No. 202127030757, dated Sep. 12, 2023. 4 pages.

* cited by examiner

| Serial number | Name | Prediction mode |
|---|---|---|
| 1 | DM | A prediction mode of a collocated center luma block |
| 2 | CCLM<br>CCLM_L<br>CCLM_T | A prediction signal is constructed based on a solution of a*luma value+b<br>a and b are calculated in CCLM based on an upper row and a left column<br>a and b are calculated in CCLM_L based on a left column<br>a and b are calculated in CCLM_T based on an upper row |
| 3 | DC | Replaced with an angular mode with a prediction direction index 66 |
| 4 | PLANAR | Replaced with an angular mode with a prediction direction index 66 |
| 5 | VER | Replaced with an angular mode with a prediction direction index 66 |
| 6 | HOR | Replaced with an angular mode with a prediction direction index 66 |

FIG. 9

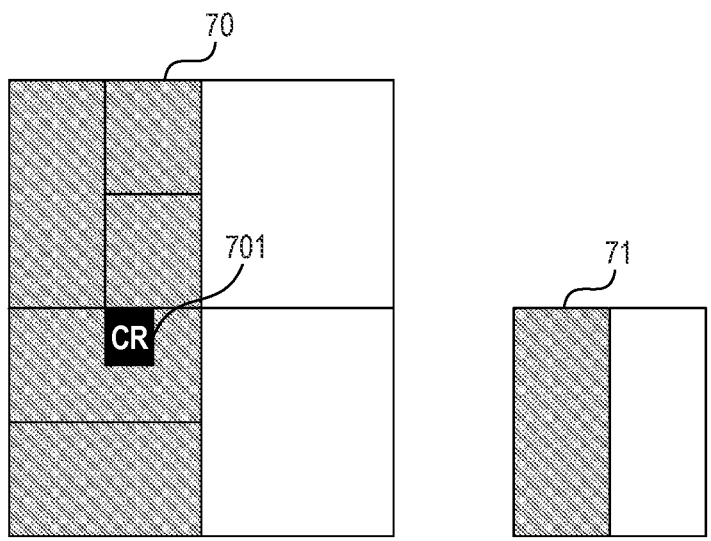

FIG. 10

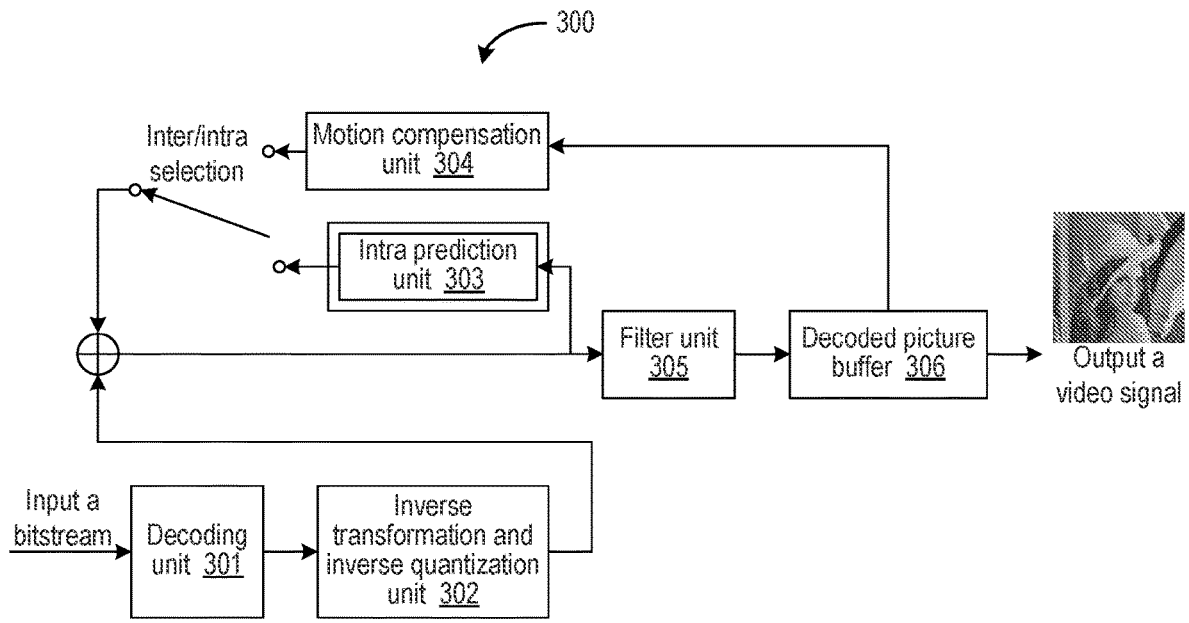

FIG. 12

| A width-to-height ratio of a present coding block and a width-to-height ratio of a reference block are acquired, the reference block being a coding block correlated with the present coding block | S101 |

| When the width-to-height ratio of the present coding block is different from the width-to-height ratio of the reference block, an angular replacement prediction mode corresponding to the reference block is adjusted to obtain an adjusted angular replacement prediction mode, the angular replacement prediction mode being an extended angular prediction mode under a wide-angle mode | S102 |

| A prediction mode list of the present coding block is constructed based on the adjusted angular replacement prediction mode for intra prediction of the present coding block | S103 |

FIG. 13

INTRA PREDICTION METHOD AND DEVICE, AND COMPUTER STORAGE MEDIUM

CROSS-REFERENCE TO RELATED APPLICATION

This is a continuation application of International Patent Application No. PCT/CN2019/070155 filed on Jan. 2, 2019, the content of which is incorporated herein by reference in its entirety.

TECHNICAL FIELD

Embodiments of the disclosure relate to the field of video coding, and particularly to an intra prediction method and device and a computer storage medium.

BACKGROUND

In a luma prediction process of a next-generation video coding standard H.266 or Versatile Video Coding (VVC), for reducing entropy coding, a Most Probable Mode (MPM) list may be constructed to store optimized prediction modes for an above neighbouring block and left neighbouring block of a present coding block. According to a principle of high spatial similarities, a prediction mode selected for the present block may be the same as a mode in the MPM list at a relatively high probability, and thus the prediction mode for the present block may be encoded by use of a smaller number of bits. However, due to a wide-angle mode for a non-square block, the acquired prediction mode is opposite to a closest mode of a real prediction direction. Furthermore, when luma intra prediction is performed based on the MPM list, the intra prediction accuracy may be reduced greatly, and the coding and decoding efficiency is further reduced.

SUMMARY

The embodiments of the disclosure provide an intra prediction method and device and a non-transitory computer storage medium, which can improve the intra prediction accuracy effectively and simultaneously improve the coding and decoding efficiency.

An intra prediction method is provided, which may be implemented by a decoder and include: decoding a bitstream and acquiring a width-to-height radio of a present coding block; decoding a bitstream and acquiring a reference block correlated with the present coding block; adjusting an angular replacement prediction mode corresponding to the reference block based on the width-to-height radio of the present coding block to obtain an adjusted angular replacement prediction mode; and taking use of the adjusted angular replacement prediction mode for intra prediction of the present coding block.

An intra prediction method is provided, which may be implemented by an encoder and include: acquiring a width-to-height radio of a present coding block; acquiring a reference block correlated with the present coding block; adjusting an angular replacement prediction mode corresponding to the reference block based on the width-to-height radio of the present coding block to obtain an adjusted angular replacement prediction mode; and taking use of the adjusted angular replacement prediction mode for intra prediction of the present coding block.

A decoder is provided, which includes a processor, a memory storing instructions executable by the processor, a communication interface and a bus configured to connect the processor, the memory and the communication interface. When the instructions are executed by the processor, the processor implements operations including: decoding a bitstream and acquiring a width-to-height radio of a present coding block; decoding a bitstream and acquiring a reference block correlated with the present coding block; adjusting an angular replacement prediction mode corresponding to the reference block based on the width-to-height radio of the present coding block to obtain an adjusted angular replacement prediction mode; and taking use of the adjusted angular replacement prediction mode for intra prediction of the present coding block.

An encoder is provided, which includes a processor, a memory storing instructions executable by the processor, a communication interface and a bus configured to connect the processor, the memory and the communication interface. When the instructions are executed by the processor, the processor implements operations including: acquiring a width-to-height radio of a present coding block; acquiring a reference block correlated with the present coding block; adjusting an angular replacement prediction mode corresponding to the reference block based on the width-to-height radio of the present coding block to obtain an adjusted angular replacement prediction mode; and taking use of the adjusted angular replacement prediction mode for intra prediction of the present coding block.

A non-transitory computer-readable storage medium storing a program is provided. The program may be executed by a processor to implement any abovementioned intra prediction method.

BRIEF DESCRIPTION OF THE DRAWINGS

FIG. 7 is a schematic diagram of Vertical (VER) prediction according to an embodiment of the disclosure.

FIG. 8 is a schematic diagram of Horizontal (HOR) prediction according to an embodiment of the disclosure.

FIG. 9 is a schematic diagram of a chroma intra candidate mode set according to an embodiment of the disclosure.

FIG. 10 is a schematic diagram of a chroma block and a luma block according to an embodiment of the disclosure.

FIG. 12 is a structure block diagram of a video decoder according to an embodiment of the disclosure.

FIG. 13 is an implementation flowchart of an intra prediction method according to an embodiment of the disclosure.

DETAILED DESCRIPTION

Figure 1:
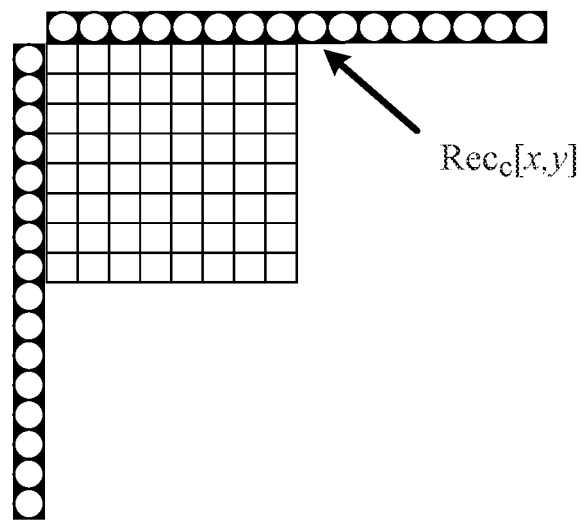
FIG. 1 is a schematic diagram of an intra prediction mode according to an embodiment of the disclosure.

The technical solutions in the embodiments of the disclosure will be clearly and completely described below in combination with the drawings in the embodiments of the disclosure. It is to be understood that the specific embodiments described here are adopted not to limit the related disclosure but only to explain the disclosure. In addition, it is also to be noted that, for convenient description, only parts related to the disclosure are illustrated in the drawings.

In video coding, prediction values of a present processing block may be constructed based on a reconstructed picture existing in space or time, and only difference values between true values and the prediction values are transmitted, so as to reduce a transmitted data volume. A spatial correlation in a picture or a picture region is utilized for intra prediction. Intra prediction of the present processing block may be executed based on pixels in a neighbouring processing block that has been processed. For example, the prediction values of a present processing block may be constructed based on an upper row and a left column of the present processing block. FIG. 1 is a schematic diagram of intra prediction. As shown in FIG. 1, each pixel of the present processing block is predicted by use of the pixels in the neighbouring processing block.

Figure 2:
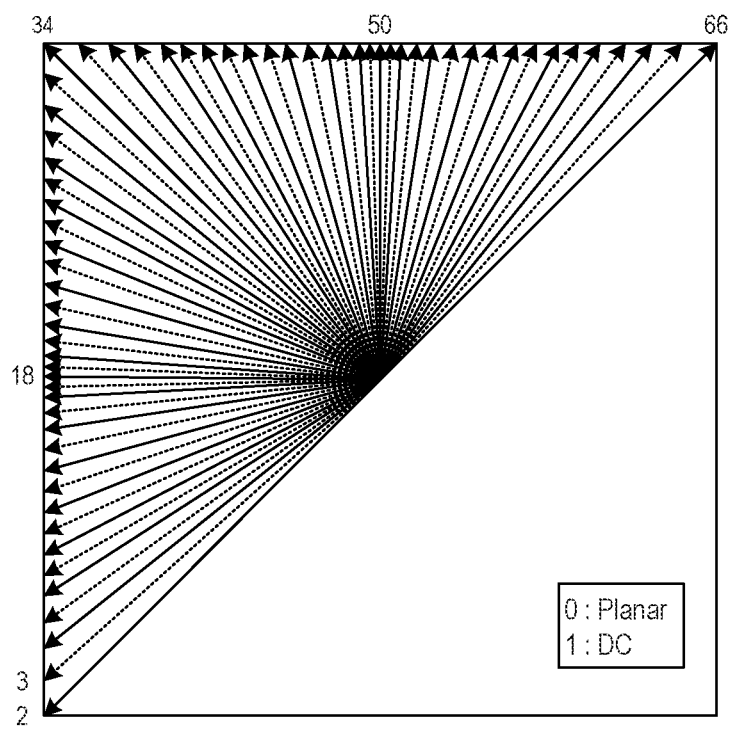
FIG. 2 is a schematic diagram of 67 intra prediction modes supported by VVC according to an embodiment of the disclosure.

Selection of a prediction direction is important to intra prediction. Specifically, when the prediction values of the present processing block are constructed by use of pixels in a neighbouring coding block, multiple prediction directions may be adopted. FIG. 2 shows 67 intra prediction modes supported by VVC. As shown in FIG. 2, the 67 intra prediction modes specifically include 65 prediction directions corresponding to prediction direction indexes 2 to 66, and also include a PLANAR mode with index 0 and a Direct Current (DC) mode with index 1.

On one hand, in the embodiments of the disclosure, based on FIG. 2, since the prediction directions of 65 angular prediction modes are defined to be −135 degrees (the mode 2) to 45 degrees (the mode 66) clockwise, the angle range is defined in such a manner so as to be compatible with a specified direction of High Efficiency Video Coding (HEVC), without taking into account additional Quadtree Plus Binary Tree (QTBT) structures in next-generation VVC. Introduction of the QTBT structures may cause generation of some non-square blocks. Wide-angle modes are proposed for non-square blocks in proposal K0500 presented in the Kth meeting of the Joint Video Experts Team (JVET).

A wide-angle mode is only applied to non-square blocks, as shown below.

When a width of a coding block is greater than a height, an angle may exceed 45 degrees in a top-right direction.

When the height of the coding block is greater than the width, the angle may exceed 45 degrees in a bottom-left direction.

Specifically, for a non-square block, some conventional angular prediction modes (i.e., the mode 2 to the mode 66) may be replaced with extended wide-angle modes. The number of the conventional angular modes required to be replaced is correlated with a ratio of a long side to short side of a coding block. When the ratio is higher, the number of conventional angular modes required to be replaced with wide-angle modes is larger, as shown in Table 1.

TABLE 1

Conventional intra Modes Required to Be Replaced with Wide-Angle Modes in K0500

| Relationship between width and height of a coding block | Conventional intra modes required to be replaced with wide-angle modes |
| --- | --- |
| W/H = 2 | Modes 2, 3, 4, 5, 6, 7 |
| W/H > 2 | Modes 2, 3, 4, 5, 6, 7, 8,9, 10, 11 |
| W/H = 1 | None |
| H/W = 1/2 | Modes 61, 62, 63, 64, 65, 66 |
| H/2 < 1/2 | Modes 57, 58, 59, 60, 61, 62, 63, 64, 65, 66 |

In Table 1. W represents the width of the coding block, and H represents the height of the coding block. When the width is greater than the height, an angle in a bottom-left direction is required to be replaced with a wide-angle mode under which an angle at a top-right direction exceeds 45 degrees. When a width-height ratio is 2, modes 2, 3, 4, 5, 6 and 7 may be replaced correspondingly with wide-angle modes 67, 68, 69, 70, 71 and 72. When the width-height ratio is higher than 2, modes 2, 3, 4, 5, 6, 7, 8, 9, 10 and 11 may be replaced correspondingly with modes 67, 68, 69, 70, 71, 72, 73, 74, 75 and 76. When the height is greater than the width, an angle in a top-right direction is required to be replaced with a wide-angle mode under which an angle at a bottom-left direction exceeds 45 degrees. When the height-width ratio is 2, modes 61, 62, 63, 64, 65 and 66 may be replaced correspondingly with wide-angle modes −6, −5, −4, −3, −2 and −1. When the height-width ratio is higher than 2, modes 57, 58, 59, 60, 61, 62, 63, 64, 65 and 66 may be replaced correspondingly with modes −10, −9, −8, −7, −6, −5, −4, −3, −2 and −1.

Figure 3:
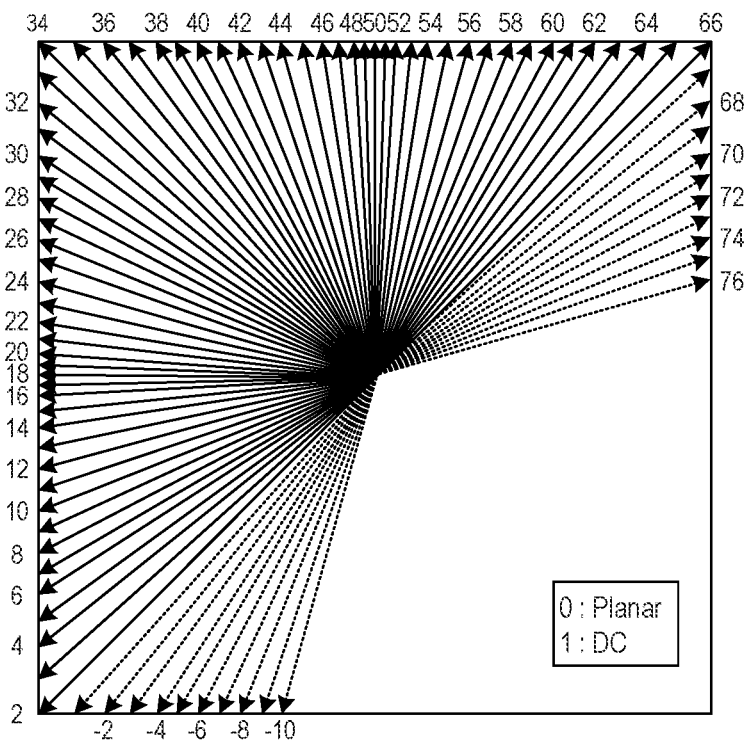
FIG. 3 is a schematic diagram of wide-angle modes in View Transformation Model (VTM) 2.0 according to an embodiment of the disclosure.

As shown in FIG. 3, in wide-angle modes under VTM2.0, there are totally 85 angular modes and the PLANAR and DC modes. The modes −10 to −1 and the modes 67 to 76 exceed a range of 45 degrees to −135 degrees, namely they are wide-angle modes. Angular directions from 45 degrees (the mode 66) to −135 degrees (the mode 2) in a clockwise direction are designed for square blocks.

Each wide-angle prediction direction is associated with a conventional prediction direction. A prediction direction opposite to a corresponding conventional prediction mode may be adopted for a wide-angle mode, so that a reference sample used in the wide-angle mode is on a side (left column or upper row) different from that in the corresponding conventional prediction mode.

Figure 4:
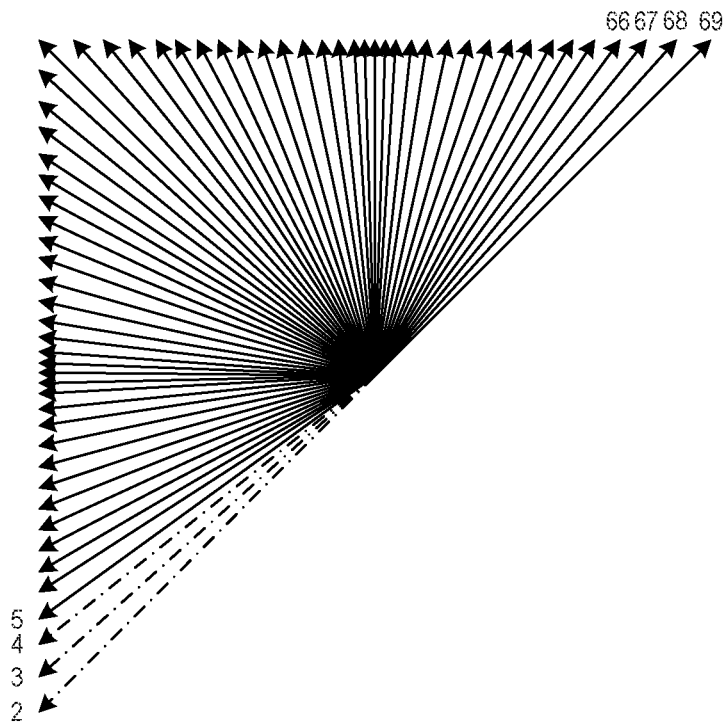
FIG. 4 is an exemplary schematic diagram of an intra prediction mode for a coding block with a width being greater than a height.

In FIG. 4, an intra prediction mode for a coding block with a width being greater than a height is taken as an example. In a prediction process, some bottom-left angles may be removed and replaced with wide-angle modes with angles at the top-right direction exceeding 45 degrees; the mode 2 is replaced with the mode 67, the mode 3 is replaced with the mode 68, and the mode 4 is replaced with the mode 69. The number of modes required to be replaced with wide-angle modes is correlated with a width-to-height radio of a coding block. Specifically, the extended mode 67 and the conventional mode are opposite in direction, a reference sample on the left side is used in the mode 3, and a reference sample on the top side is used in the mode 67. By parity of reasoning, the mode 68 and the conventional mode 4 are opposite in direction, and the mode 69 and the conventional mode 5 are opposite in direction.

A unified wide-angle mode proposed in proposal L0279 is adopted in latest VVC reference software VTM3.0. In VTM2.0.1, there are 85 angular modes, the PLANAR mode and the DC mode, and directions of 20 modes exceed the range of 45 degrees to −135 degrees, namely they are wide-angle modes. The totally 65 angular modes from the mode 2 to the mode 66 are angular prediction modes designed for square blocks. Diagonal directions (the modes 2, 34 and 66) of all the square blocks are included in the prediction modes. However, prediction modes for non-square blocks do not always cover diagonal directions thereof. In addition, an angular direction of a square block is from a bottom-left diagonal direction to a top-right diagonal direction, but an angular direction of a non-square block is not like that.

In a unified method proposed in proposal L0279, the number of conventional modes required to be replaced with wide-angle modes is modified such that an angle range after extension to wide angles is right from the bottom-left diagonal direction to the top-right diagonal direction, as shown in Table 2. In addition, in the method, extended wide-angle modes and directions of the conventional angular modes required to be replaced are also modified appropriately to include diagonal directions of coding blocks.

TABLE 2

Conventional Intra Modes Required to Be Replaced with Wide-Angle Modes in L0279

| Relationship between width and height coding block | Conventional intra modes required to be replaced with wide-angle modes |
| --- | --- |
| W/H = 2 | Modes 2, 3, 4, 5, 6, 7-67, . . . , 72 |
| W/H = 4 | Modes 2, 3, 4, 5, 6, 7, 8, 9, 10, 11-67, . . . , 76 |
| W/H = 8 | Modes 2, 3, 4, 5, 6, 7, 8, 9, 10, 11, 12, 13-67, . . . , 78 |
| W/H = 16 | Modes 2, 3, 4, 5, 6, 7, 8, 9, 10, 11, 12, 13, 14, 15-67, . . . , 80 |
| W/H = 1 | None |
| H/W = 2 | Modes 61, 62, 63, 64, 65, 66-6, . . . , −1 |
| H/W = 4 | Modes 57, 58, 59, 60, 61, 62, 63, 64, 65, 66-10, . . . , −1 |
| H/W = 8 | Modes 55, 56, 57, 58, 59, 60, 61, 62, 63, 64, 65, 66-12, . . . , −1 |
| H/W = 16 | Modes 53, 54, 55, 56, 57, 58, 59, 60, 61, 62, 63, 64, 65, 66-14, . . . , −1 |

Figure 5:
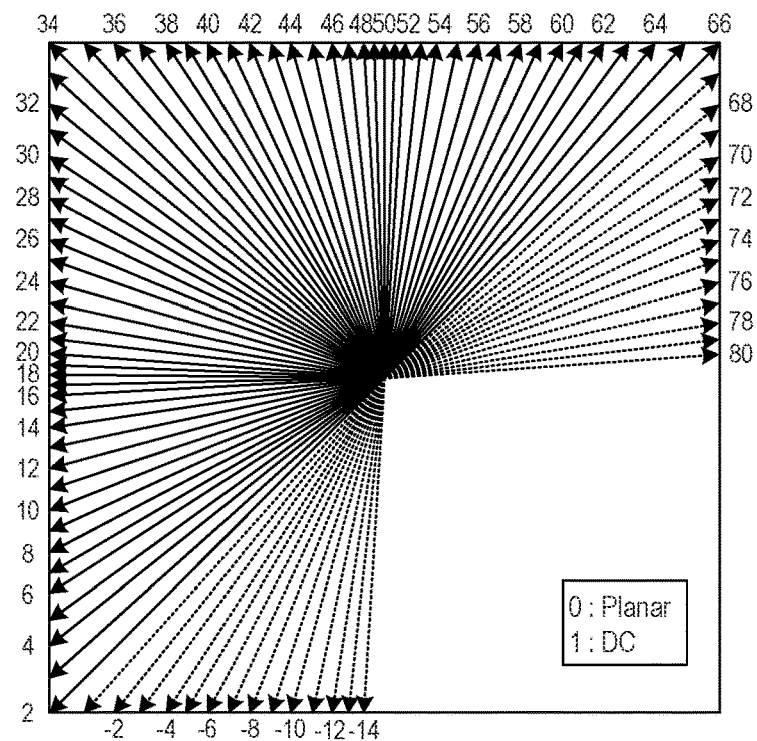
FIG. 5 is a schematic diagram of a wide-angle mode in VTM3.0 according to an embodiment of the disclosure.

In a non-square block, when a ratio of a long side to a short side is 2, 6 modes are required to be replaced; when the ratio of the long side to the short side is 4, 10 modes are required to be replaced; when the ratio of the long side to the short side is 8, 12 modes are required to be replaced; and when the ratio of the long side to the short side is 16, 14 modes are required to be replaced. As shown in FIG. 5, there are totally 93 angular modes and the PLANAR and DC modes, and directions of 28 angular modes exceed the range of −135 degrees to 45 degrees, namely they are wide-angle modes.

Figure 6:
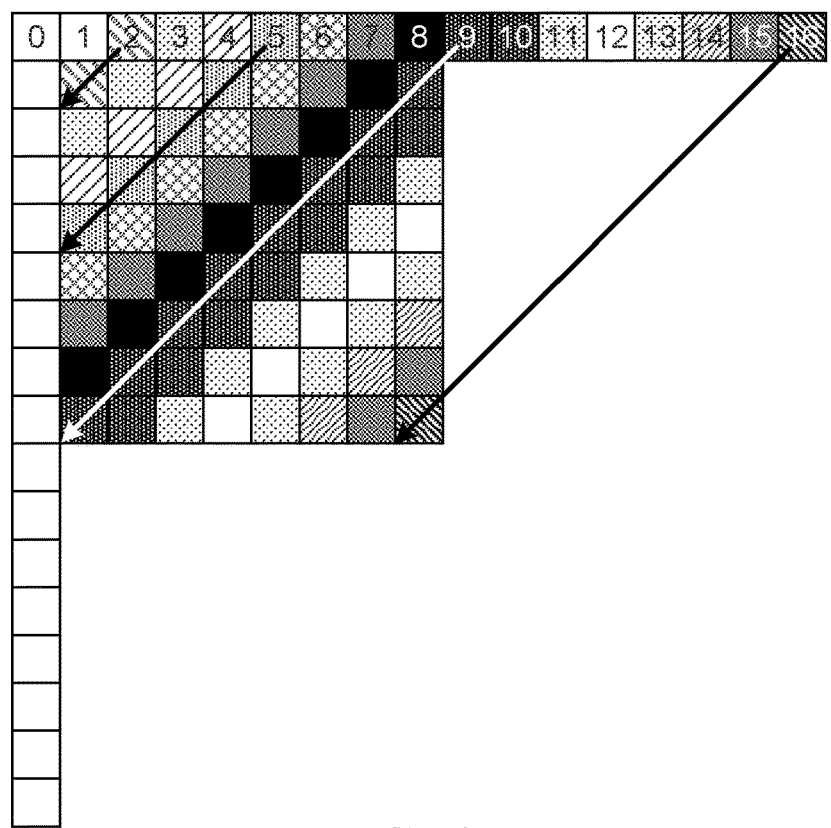
FIG. 6 is a flowchart of an intra prediction method according to an embodiment of the disclosure.

On the other hand, in the embodiments of the disclosure, based on FIG. 2, FIG. 6 is a schematic diagram of an intra prediction method. As shown in FIG. 3, when a prediction value of each pixel is constructed in a direction corresponding to a prediction direction index 66, pixels numbered with 0 to 16 are top-row data of a present processing block. Each pixel of the present processing block is filled based on pixels in a top-right diagonal direction.

Furthermore, in the embodiments of the disclosure, the PLANAR mode is mainly adopted for a region with a relatively smooth picture texture and a relatively gradient process, and a corresponding prediction method is determining pixel values of neighbouring processing blocks corresponding to a present processing block in top, bottom, left and right directions as reference pixel values for further linear interpolation and averaging calculation. Compared with the PLANAR mode, the DC mode is mainly adopted for a region where a picture is flat, a texture is smooth and there is not so great gradient, and a corresponding prediction method is specifically performing prediction based on decoded reference pixels in a last row at the top of the present processing block and decoded reference pixels in a rightmost column on the left of the present processing block. It can be seen that, in intra prediction, both the PLANAR mode and the DC mode are relatively flat predicted block construction manners. In the DC mode, the whole chroma block is filled with an average value of reference pixels in an upper row and a left column. In the PLANAR mode, the chroma block is filled in a gradient manner.

Figures 7, 8:
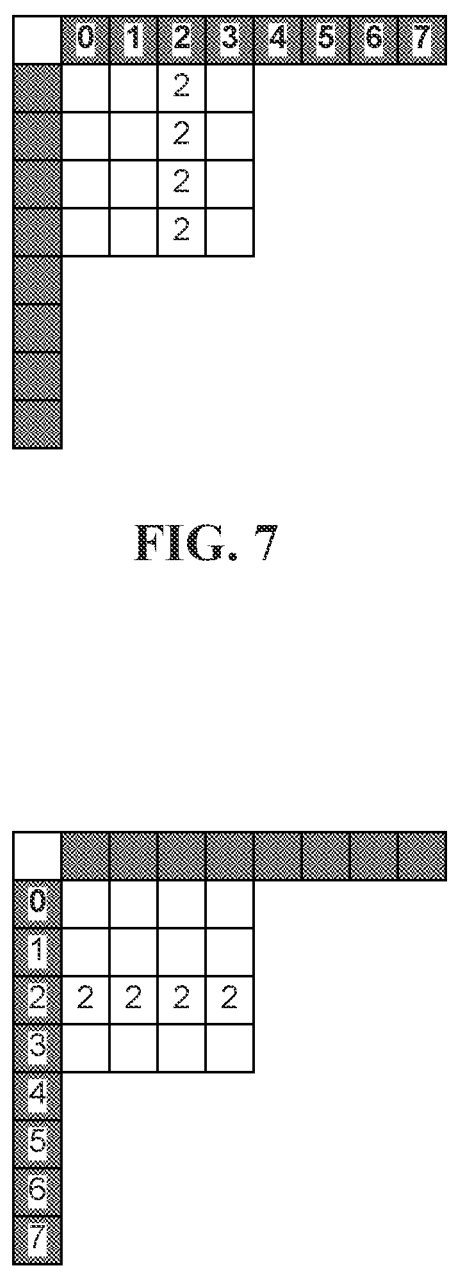

In FIG. 2, there are also two special directional modes. i.e., a VER mode corresponding to a direction index 50 and a HOR mode corresponding to a prediction direction index 18, namely vertical prediction and horizontal prediction. FIG. 7 is a schematic diagram of VER prediction, and FIG. 8 is a schematic diagram of HOR prediction. As shown in FIG. 7 and FIG. 8, when a prediction direction is VER prediction. VER prediction may be performed based on the pixel values at the top; and when the prediction direction is HOR prediction, HOR prediction may be performed based on the pixel values on the left.

During luma intra prediction, prediction may be performed sequentially according to the modes 0 to 66 in FIG. 2, and then a prediction mode having a minimum difference value with the present processing block, i.e., the most matched prediction mode, is selected to construct prediction values. The difference value and the prediction direction may be written by an encoder into a bitstream. The bitstream may be acquired and parsed by a decoder to obtain a prediction mode index and then calculate a luma prediction value. The luma prediction value may be added to a difference signal parsed from the bitstream to obtain a reconstructed luma value.

However, chroma intra prediction is different from the luma intra prediction. This is because, for reducing the encoding and decoding complexity, during chroma intra prediction, only part of prediction modes are extracted and combined with a Cross-Component Linear Model Prediction (CCLM) to form an alternative mode set, and one mode is selected from the alternative mode set for intra prediction. In VVC, a chroma intra candidate mode set includes multiple chroma intra prediction modes, for example, a Linear Model Prediction (LM) mode, an LM_Top (LM_T) mode, an LM_Left (LM_L) mode, the DC mode, the PLANAR mode, the VER mode and the HOR mode.

FIG. 9 is a schematic diagram of a chroma intra candidate mode set. As shown in FIG. 9, the chroma intra candidate mode set may include different modes. In related art, chroma intra prediction may be performed based on different modes. For example, a DM may represent a prediction mode of a collocated luma center block, and a cross-component linear model prediction (CCLM) mode represents construction of a prediction signal by use of a solution of (a*luma value+b), where both a and b are natural numbers. When the DM is the DC mode, the PLANAR mode, the VER mode or the HOR mode, the mode may be replaced with an angular mode with a prediction direction index 66.

Furthermore, VVC supports independent division of luma and chroma, namely division of luma may be different from division of chroma, so that a chroma block may correspond to multiple luma blocks. FIG. 10 is an arrangement diagram of a luma block and chroma block corresponding to a present block. As shown in FIG. 10, the square 70 on the left is a chroma block corresponding to a present chroma block, and the square 71 on the right is the present chroma block. When intra prediction is performed for the present chroma block, a prediction direction of a center block of the chroma block 71, i.e., a luma block CR 701 in the square 70 on the right in FIG. 10, is utilized.

Figure 11:
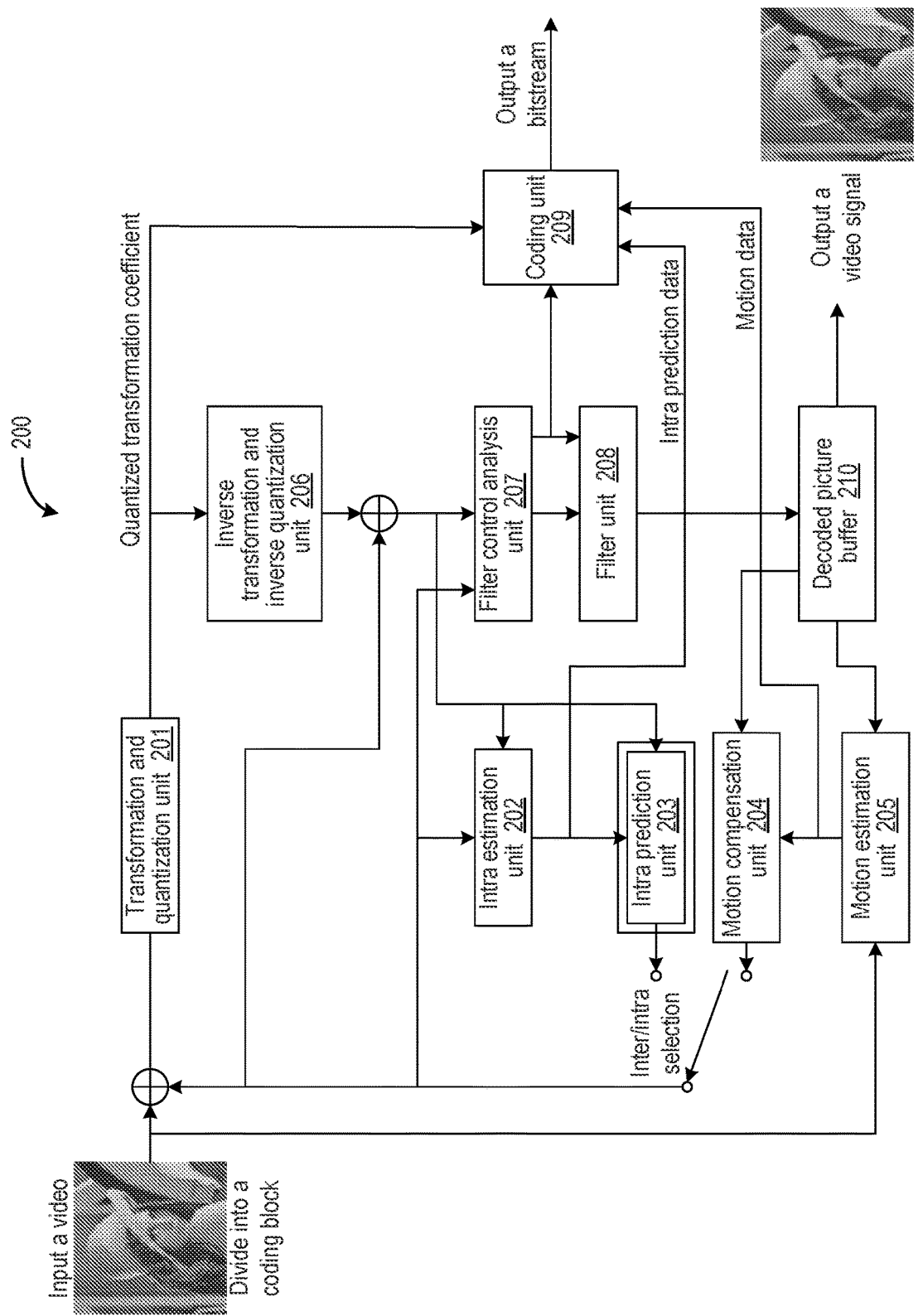
FIG. 11 is a structure block diagram of a video encoder according to an embodiment of the disclosure.

In the embodiments of the disclosure, an intra prediction method may be applied to an intra prediction part in a hybrid video coding framework. Specifically, the intra prediction method may be applied to both an encoder and a decoder. For example, FIG. 8 is a flowchart of video coding. As shown in FIG. 11, a composition block diagram of a video coding system according to an embodiment of the disclosure is shown. The video coding system 200 includes a transformation and quantization unit 201, an intra estimation unit 202, an intra prediction unit 203, a motion compensation unit 204, a motion estimation unit 205, an inverse transformation and inverse quantization unit 206, a filter control analysis unit 207, a filter unit 208, a coding block 209 and a decoded picture buffer 210, etc. The filter unit 208 may implement deblocking filtering and Sample Adaptive Offset (SAO) filtering. The coding block 209 may implement header information coding and Context-based Adaptive Binary Arithmetic Coding (CABAC). For an input original video signal, a video coding block may be obtained by division of a Coding Tree Unit (CTU), and then residual pixel information obtained by intra or inter prediction may be processed by the transformation and quantization unit 201 to transform the video coding block, including transforming the residual information from a pixel domain to a transformation domain and quantizing an obtained transformation coefficient to further reduce a bit rate. The intra estimation unit 202 and the intra prediction unit 203 are configured to perform intra prediction on the video coding block. Specifically, the intra estimation unit 202 and the intra prediction unit 203 are configured to determine an intra prediction mode to be adopted to encode the video coding block. The motion compensation unit 204 and the motion estimation unit 205 are configured to perform intra prediction coding on the received video coding block relative to one or more blocks in one or more reference frames to provide time prediction information. Motion estimation implemented by the motion estimation unit 205 is a process of generating a motion vector. A motion of the video coding block may be estimated based on the motion vector, and then the motion compensation unit 204 may perform motion compensation based on the motion vector determined by the motion estimation unit 205. After the intra prediction mode is determined, the intra prediction unit 203 is further configured to provide selected intra prediction data for the coding block 209, and the motion estimation unit 205 may also send motion vector data determined by calculation to the coding block 209. In addition, the inverse transformation and inverse quantization unit 206 is configured to reconstruct the video coding block, namely a residual block may be reconstructed in a pixel domain, an artifact with a blocking effect in the reconstructed residual block may be removed by the filter control analysis unit 207 and the filter unit 208 and then the reconstructed residual block may be added to a prediction block in a frame of the decoded picture buffer 210 to generate a reconstructed video coding block. The coding block 209 is configured to encode various coding parameters and quantized transformation coefficients. In a CABAC-based coding algorithm, a context content may be configured to encode information indicating the determined intra prediction mode based on neighbouring coding blocks to output a bitstream of the video signal. The decoded picture buffer 210 is configured to store the reconstructed video coding block as a prediction reference. As video pictures are encoded, new reconstructed video coding blocks may be continuously generated, and these reconstructed video coding blocks may be stored in the decoded picture buffer 210.

Referring to FIG. 12, a composition block diagram example of a video decoding system according to an embodiment of the disclosure is shown. The video decoding system 300 includes a decoding unit 301, an inverse transformation and inverse quantization unit 302, an intra prediction unit 303, a motion compensation unit 304, a filter unit 305 and a decoded picture buffer 306, etc. The decoding unit 301 may implement header information decoding and CABAC decoding. The filter unit 305 may implement deblocking filtering and SAO filtering. After coding processing shown in FIG. 11 is performed on an input video signal, a bitstream of the video signal is output. The bitstream is input to the video decoding system 300, and is processed by the decoding unit 301 at first to obtain a decoded transformation coefficient. A residual block may be generated in a pixel domain by processing of the inverse transformation and inverse quantization unit 302 for the transformation coefficient. The intra prediction unit 303 may be configured to generate prediction data of a present video coding block based on a determined intra prediction mode and data of a previous decoded block from a present frame or picture. The motion compensation unit 305 may analyze a motion vector and another associated syntactic element to determine prediction information for the video coding block and generate a prediction block of the video coding block that is presently decoded based on the prediction information. The residual block from the inverse transformation and inverse quantization unit 302 and the corresponding prediction block generated by the intra prediction unit 303 or the motion compensation unit 304 may be summed to form a decoded video block. An artifact with a blocking effect in the decoded video signal may be removed through the filter unit 305 to improve the video quality. Then, the decoded video block may be stored in the decoded picture buffer 306. The decoded picture buffer 306 may store a reference picture for subsequent intra prediction or motion compensation and is also configured to output a video signal, namely the recovered original video signal is obtained.

The technical solutions in the embodiments of the disclosure will be clearly and completely described below in combination with the drawings in the embodiments of the disclosure.

In an embodiment, the embodiment of the disclosure provides an intra prediction method. FIG. 13 is an implementation flowchart of an intra prediction method according to an embodiment of the disclosure. The method may include the following operations.

In S101, a width-to-height radio of a present coding block and a width-to-height radio of a reference block are acquired, the reference block being a coding block correlated with the present coding block.

The intra prediction method provided In the embodiments of the disclosure is applied to a scenario that an intra prediction device performs luma intra prediction or chroma intra prediction on a video bitstream.

In the embodiments of the disclosure, the intra prediction device are arranged in an encoder and a decoder. This arrangement is made according to a practical condition, and is not specifically limited In the embodiments of the disclosure.

In the embodiments of the disclosure, an encoder may divide an input video frame into each coding block based on a preset division rule and add each divided coding block to a bitstream for transmission to a decoder. Then, the intra prediction device may acquire a width-to-height radio of a present coding block and a width-to-height radio of a reference block. The reference block may be a coding block correlated with the present coding block. The reference block includes, but not limited to, the above and left neighbouring reference blocks of the present coding block or a reference block of a chroma block corresponding to a luma region segmentation block. Such an example is made according to the practical condition. No specific limits are made In the embodiments of the disclosure.

It is to be noted that the intra prediction device divides a width of a coding block by a height of the coding block to obtain the width-to-height radio of the coding block.

The embodiment of the disclosure is not limited to coding blocks but applied to all units obtained by subdividing largest coding blocks according to different division rules, including predicted units. No specific limits are made herein.

In S102, when the width-to-height radio of the present coding block is different from the width-to-height radio of the reference block, an angular replacement prediction mode corresponding to the reference block is adjusted to obtain a adjusted angular replacement prediction mode, the angular replacement prediction mode being an extended angular prediction mode under a wide-angle mode.

After the intra prediction device acquires the width-to-height radio of the present coding block and the width-to-height radio of the reference block, the intra prediction device, responsive to determining that the width-to-height radio of the present coding block is different from the width-to-height radio of the reference block, may adjust the angular replacement prediction mode corresponding to the reference block to obtain the adjusted angular replacement prediction mode.

In the embodiments of the disclosure, the intra prediction device may compare the width-to-height radio of the present coding block with the width-to-height radio of the reference block. When the width-to-height radio of the present coding block is different from the width-to-height radio of the reference block, it indicates that the acquired angular replacement prediction mode corresponding to the reference block may be ineffective for the present coding block, and in such case, the intra prediction device is required to adjust the angular replacement prediction mode, the angular replacement prediction mode being an angular prediction mode extended under wide-angle mode.

Figure 14:
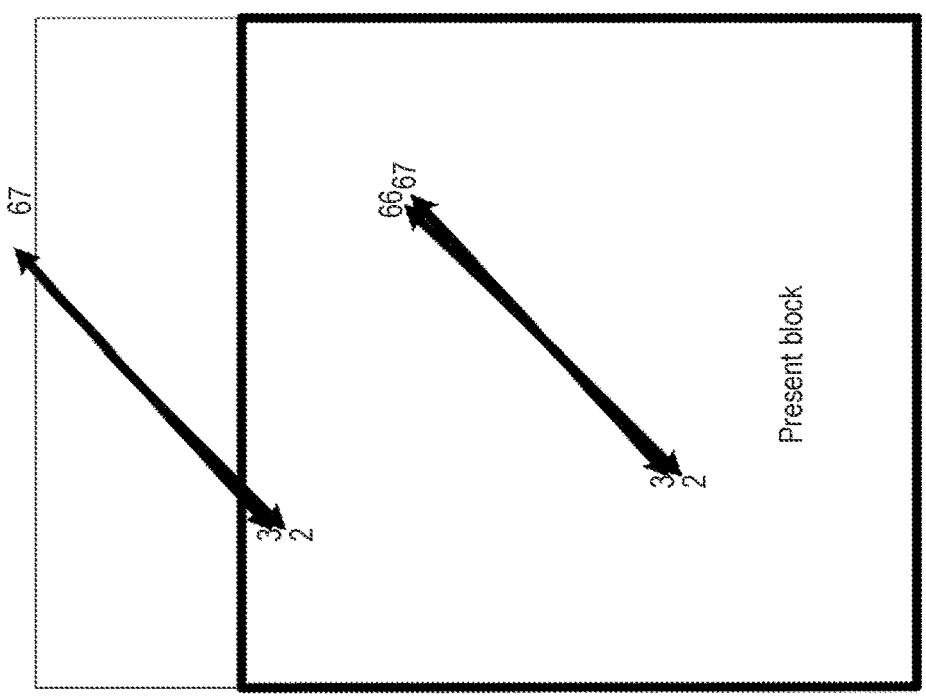
FIG. 14 is an example of determining an optimized prediction mode for an above neighbouring block under an existing wide-angle mode according to an embodiment of the disclosure.

As shown in FIG. 14, acquisition of an intra prediction mode for an above neighbouring block as a reference is taken as an example, the neighbouring block is on the upper side, and the present block is on the lower side. When an optimized prediction mode selected for the neighbouring block is a mode 67 which replaces a conventional mode 2 and transmission in a bitstream is implemented according to the mode 2, the mode 2 may be directly placed in an MPM list based on an existing MPM list construction solution. Since a width and height of the present block are equal, the wide-angle mode 67 replaced with the conventional mode 2 for the neighbouring block is ineffective for the present block. An opposite direction of the mode 67 is a mode 3, and the prediction mode 2 that may be adopted for the present block and is closest to the prediction mode in the opposite direction is practically selected and added to the MPM list. A top reference row is used in the mode 67, and a left reference row is used in the mode 2. Thus it can be seen that the prediction direction for the neighbouring block is not adopted for the present block well.

In the embodiments of the disclosure, the intra prediction device may acquire an angular intra prediction mode corresponding to the reference block. Then, the intra prediction device can determine an angular replacement prediction mode corresponding to the angular intra prediction mode from a corresponding relationship between a conventional intra mode and a wide-angle mode.

Specifically, the operation that the angular replacement prediction mode corresponding to the reference block is adjusted to obtain the adjusted angular replacement prediction mode may include the following operations. The intra prediction device may determine a maximum angular prediction mode and a minimum angular prediction mode both corresponding to the width-to-height radio of the present coding block from a preset corresponding relationship between a width-to-height radio and an angular prediction mode. Then, the intra prediction device may obtain an angular intra prediction mode neighboring to the angular replacement prediction mode according to the maximum angular prediction mode, the minimum angular prediction mode and the angular replacement prediction mode corresponding to the reference block. Finally, the intra prediction device may determine the angular intra prediction mode neighboring to the angular replacement prediction mode as the adjusted angular replacement prediction mode.

In an example, the preset corresponding relationship between a width-to-height radio and an angular prediction mode is shown in Table 3. A range of angular prediction modes corresponding to the width-to-height radio of the present coding block may be determined based on Table 3, and furthermore, the maximum angular prediction mode and the minimum angular prediction mode may be determined.

TABLE 3

Range of Angular Prediction Modes Available for Coding blocks in Different Shapes (after Replacement with Wide-Angle Modes)

| Width-to-height radio | Range of angular prediction modes available for the coding block |
|---|---|
| 1 | Modes 2-66 |
| 2 | Modes 8-72 |
| 4 | Modes 12-76 |
| 8 | Modes 14-78 |
| 16 | Modes 16-80 |

In the embodiments of the disclosure, the maximum angular prediction mode, the minimum angular prediction mode and the angular replacement prediction mode corresponding to the reference block may be input to formula (1) to obtain the adjusted angular replacement prediction mode. The formula (1) is:

$$\text{dir\_}W = \text{Clip}(\text{min}MC, \text{max}MC, \text{dir}) \quad (1).$$

dir_W represents the angular intra prediction mode neighboring to the angular replacement prediction mode, $minM_C$ represents the minimum angular prediction mode, $maxM_C$ represents the maximum angular prediction mode, and dir represents the angular replacement prediction mode corresponding to the reference block.

Specifically, the operation that the angular replacement prediction mode corresponding to the reference block is adjusted to obtain the adjusted angular replacement prediction mode may further include the following operations. The intra prediction device may determine an angular intra prediction mode in an opposite direction to the angular replacement prediction mode. Then, the intra prediction device may determine the angular intra prediction mode in an opposite direction to the angular replacement prediction mode as the adjusted angular replacement prediction mode.

In an example that the acquired mode for the reference block is the mode 2 but the prediction mode 67 is practically adopted, since the width and height of the present coding block are equal, the mode 67 is ineffective for the present block. In such case, the mode 67 is adjusted to a prediction mode 66 that may be adopted for the present coding block and is closest to the prediction mode in the same direction. The top reference row is used as a reference in both the mode 67 and the mode 66, so that the prediction direction of the neighbouring block may be adopted for the present coding block better.

In the embodiments of the disclosure, the intra prediction device may adjust the wide-angle mode to an opposite direction of the prediction direction of the wide-angle mode based on the width-to-height radio of the reference block and the width-to-height radio of the present coding block.

In an example, when a width of the reference block is greater than a height and the acquired prediction mode is 2, a practical prediction mode for the reference block is the mode 67. When the present coding block does not support the mode, since the opposite direction of the mode 67 is the mode 3, the acquired mode 2 is adjusted to the mode 3, and the mode 3 is added to the MPM list according to an abovementioned MPM list construction method. By parity of reasoning, an opposite direction of 68 is 4, etc.

In S103, a prediction mode list of the present coding block is constructed based on the adjusted angular replacement prediction mode for intra prediction of the present coding block.

After the intra prediction device adjusts the angular replacement prediction mode corresponding to the reference block to obtain the adjusted angular replacement prediction mode, the intra prediction device may construct an MPM list of the present coding block based on the adjusted angular replacement prediction mode to complete an intra prediction process of the present coding block.

In the embodiments of the disclosure, the prediction mode list may include an MPM list, and the operation that the prediction mode list of the present coding block is constructed based on the adjusted angular replacement prediction mode may include the following operations. The intra prediction device may determine at least one of the angular intra prediction mode neighboring to the angular replacement prediction mode and the angular intra prediction mode opposite to the angular replacement prediction mode in direction as the adjusted angular replacement prediction mode. Then, the intra prediction device may insert the adjusted angular replacement prediction mode into an initial MPM list to construct the MPM list, or, the intra prediction device may replace at least one of the reference block and a neighbouring mode of the reference block in the initial MPM list based on the adjusted angular replacement prediction mode to construct the MPM list, the neighbouring mode being an angular prediction mode neighboring to the angular replacement prediction mode.

It is to be noted that there are multiple different modes in the MPM list. For example, like VTM3.0, 6 different modes are selected.

Furthermore, the intra prediction device may construct the initial MPM list through the following process. The intra prediction device may sequentially calculate selection evaluation standards of preset reference row indexes of the present coding block, the selection evaluation standard including, but not limited to, a rate distortion cost. The intra prediction device may determine a reference row index corresponding to a minimum selection evaluation standard from the preset reference row indexes as a first preset reference row index. The intra prediction device may acquire an MPM list construction rule corresponding to the first preset reference row index. Then, the intra prediction device may construct the initial MPM list based on the MPM list construction rule.

In the embodiments of the disclosure, when the first preset reference row index is 0, the following construction rules are adopted for the initial MPM list:

1: an angular replacement prediction mode dirA for a left neighbouring reference block and an angular replacement prediction mode dirB for an above neighbouring reference block;

2: PLANAR/DC;

3: neighbouring modes of dirA and dirB; and

4: modes 50, 18, 50−4 and 50+4.

When the first preset reference row index is 1 or 3, the following construction rules are adopted for the initial MPM list:

1: the angular replacement prediction mode dirA for the left neighbouring reference block and the angular replacement prediction mode dirB for the top neighbouring reference block;

2: the neighbouring modes of dirA and dirB; and

3: modes 2, 34, 66 and 26.

In an example, the intra prediction device may add the adjusted angular replacement prediction mode to the MPM list according to the following specific rules. The MPM list is constructed according to the following sequence until 6 different MPM modes are included.

a: When a reference row index for the present coding block is 0:

1: the angular replacement prediction mode dirA for the left neighbouring reference block and the angular replacement prediction mode dirB for the above neighbouring reference block;

2: PLANAR/DC.

3: angular replacement prediction modes dirA_W and dirB_W obtained by adjusting dirA and dirB;

4: the neighbouring modes of dirA and dirB; and

5: the modes 50, 18, 50−4 and 50+4.

b: When the reference row index for the present block is 1 or 3:

1: the angular replacement prediction mode dirA for the left neighbouring reference block and the angular replacement prediction mode dirB for the above neighbouring reference block;

2: the angular replacement prediction modes dirA_W and dirB_W obtained by adjusting dirA and dirB:

3: the neighbouring modes of dirA and dirB; and

4: the modes 2, 34, 66 and 26.

It is to be noted that, in a construction process of the MPM list, dir_W may be placed after the PLANAR/DC mode and before the neighbouring mode, or, dir_W may be placed before the PLANAR/DC mode, or, dir_W may be placed after the neighbouring mode, or at least one of dir and the neighbouring mode of dir may be replaced with dir_W. The operations are specifically selected according to the practical condition. No specific limits are made In the embodiments of the disclosure.

In the embodiments of the disclosure, after the intra prediction device constructs the MPM list of the present coding block based on the adjusted angular replacement prediction mode, the intra prediction device may match an optimized prediction mode for the present coding block to the MPM list. While matching succeeds, an index of the optimized prediction mode for the present coding block in the MPM list is encoded based on a context mode. While matching fails, the optimized prediction mode for the present coding block is encoded by use of a truncated binary code.

In the embodiments of the disclosure, the encoder may determine an optimized prediction mode for the present coding block according to a preset selection strategy and transmit the optimized prediction mode for the present coding block to the decoder through a bitstream.

In the embodiments of the disclosure, the prediction mode list may include a chroma prediction mode list. The operation that the intra prediction device constructs the prediction mode list of the present coding block based on the adjusted angular replacement prediction mode may include the following operations. The intra prediction device may determine at least one of the angular intra prediction mode neighboring to the angular replacement prediction mode and the angular intra prediction mode opposite to the angular replacement prediction mode in direction as the adjusted angular replacement prediction mode. Then, the intra prediction device may determine the adjusted angular replacement prediction mode as an alternative mode in an initial chroma prediction mode list to construct the chroma prediction mode list corresponding to the present coding block, or, the intra prediction device may replace a DM in the initial chroma prediction mode list based on the adjusted angular replacement prediction mode to construct the chroma prediction mode list. The operations are specifically selected according to the practical condition. No specific limits are made In the embodiments of the disclosure.

In the embodiments of the disclosure, the initial chroma prediction mode list may be constructed according to a preset chroma intra prediction construction method. The initial chroma prediction mode list is shown in FIG. 9. The alternative mode in the initial chroma prediction mode list is 66.

In the embodiments of the disclosure, the operation that the intra prediction device determines the adjusted angular replacement prediction mode as the alternative mode in the initial chroma prediction mode list may include the following operations. The intra prediction device may determine an optimized prediction mode for the present coding block. Then, the intra prediction device may derive a chroma intra prediction mode based on the optimized prediction mode. When the chroma intra prediction mode meets a preset prediction mode in the initial chroma prediction mode list, the intra prediction device may replace the chroma intra prediction mode with the adjusted angular replacement prediction mode. The preset prediction mode may include any one of a DC mode, a PLANAR mode, a VER mode and a HOR mode.

In the embodiments of the disclosure, when the intra prediction device determines that the chroma intra prediction mode meets any one of the DC mode, the PLANAR mode, the VER mode and the HOR mode, the intra prediction device may replace the chroma intra prediction mode.

In the embodiments of the disclosure, the operation that the intra prediction device constructs the prediction mode list of the present coding block based on the adjusted angular replacement prediction mode may include the following operations. The intra prediction device may insert the adjusted angular replacement prediction mode prior to an existing angle fine-adjustment row in an initial MDMS list to construct an MDMS list, or, the intra prediction device may replace a DM in the initial MDMS list based on the adjusted angular replacement prediction mode to construct the MDMS list. The operations are specifically selected according to the practical condition. No specific limits are made In the embodiments of the disclosure.

In the embodiments of the disclosure, a construction method for the initial MDMS list is shown in Table 4.

TABLE 4

Construction Method for Initial MDMS List

| Serial number | Name | Descriptions |
|---|---|---|
| 1 | CCLM | A prediction signal is constructed based on a solution of a * luma value + b |
| 5 prediction modes are selected in order | DM | Intra prediction modes for luma blocks at five positions, i.e., the center, the top left, the top-right, the bottom-left and the bottom-right, of the present chroma block, are utilized |
| | Chrome neighboring block | Intra prediction modes for the left, top-left, bottom-left, top and top-right blocks spatially neighboring to the chroma block |
| | DC | Intra direction index 1 |
| | PLANAR | Intra direction index 0 |
| | fine-adjustment of existing angular mode | Modes derived by adding and subtracting 1based on the existing angular modes |
| | Default mode | VER (18), HOR (50), 2, 34, 66, 10, 26 |

In the embodiments of the disclosure, the intra prediction device may insert a row prior to the existing angular mode fine-adjustment row in the initial MDMS list, the row being the adjusted angular replacement prediction mode, or may replace a DM row based on the adjusted angular replacement prediction mode. The operations are specifically selected according to the practical condition. No specific limits are made In the embodiments of the disclosure.

It can be understood that, when the intra prediction device determines that the width-to-height radio of the present coding block is different from the width-to-height radio of the reference block, the intra prediction device may adjust the angular replacement prediction mode for the reference block to a direction closest to a real prediction direction of a neighbouring adjustment unit in the same direction or adjust the angular replacement prediction mode for the reference block to an opposite direction of the neighbouring adjustment unit at the same angle and add the adjusted angular replacement prediction mode to the MPM list, so that the accuracy of a prediction angle is further improved. When luma intra prediction is performed based on the MPM list and chroma intra prediction is performed based on the chroma prediction mode list, the intra prediction accuracy may be improved greatly and the encoding efficiency is further improved.

Figure 15:
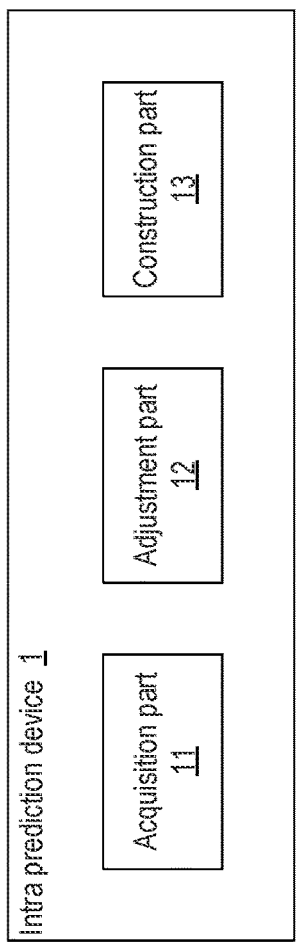
FIG. 15 is a first composition structure diagram of an intra prediction device according to an embodiment of the disclosure.

Based on the abovementioned embodiment, in another embodiment of the disclosure, FIG. 15 is a first composition structure diagram of an intra prediction device according to an embodiment of the disclosure. As shown in FIG. 15, the intra prediction device 1 In the embodiments of the disclosure may include an acquisition part 11, an adjustment part 12, a construction part 13, a determination part 14, an insertion part 15, a replacement part 16, a calculation part 17, a matching part 18 and a coding part 19.

The acquisition part 11 is configured to acquire a width-to-height radio of a present coding block and a width-to-height radio of a reference block, the reference block being a coding block correlated with the present coding block.

The adjustment part 12 is configured to, when the width-to-height radio of the present coding block is different from the width-to-height radio of the reference block, adjust an angular replacement prediction mode corresponding to the reference block to obtain an adjusted angular replacement prediction mode, the angular replacement prediction mode being an extended angular prediction mode under a wide-angle mode.

The construction part 13 is configured to construct a prediction mode list of the present coding block based on the adjusted angular replacement prediction mode for intra prediction of the present coding block.

Furthermore, in the embodiments of the disclosure, the intra prediction device may further include the determination part 14.

The determination part 14 is further configured to determine a maximum angular prediction mode and minimum angular prediction mode corresponding to the width-to-height radio of the present coding block from a preset corresponding relationship between a width-to-height radio and an angular prediction mode.

The adjustment part 12 is further configured to obtain and determine an angular intra prediction mode neighboring to the angular replacement prediction mode as the adjusted angular replacement prediction mode according to the maximum angular prediction mode, the minimum angular prediction mode and the angular replacement prediction mode corresponding to the reference block.

Furthermore, in the embodiments of the disclosure, the adjustment part 12 is further configured to determine an angular intra prediction mode opposite to the angular replacement prediction mode in direction as the adjusted angular replacement prediction mode.

Furthermore, in the embodiments of the disclosure, the prediction mode list includes an MPM list, and the device may further include the insertion part 15.

The insertion part 15 is configured to determine at least one of an angular intra prediction mode neighboring to the angular replacement prediction mode and an angular intra prediction mode opposite to the angular replacement prediction mode in direction as the adjusted angular replacement prediction mode and insert the adjusted angular replacement prediction mode into an initial MPM list to construct the MPM list.

Furthermore, in the embodiments of the disclosure, the device may further include the replacement part 16.

The replacement part 16 is configured to replace at least one of the reference block and a neighbouring mode of the reference block in the initial MPM list based on the adjusted angular replacement prediction mode to construct the MPM list, the neighbouring mode being an angular prediction mode neighboring to the angular replacement prediction mode.

Furthermore, in the embodiments of the disclosure, the device may further include the calculation part 17. The calculation part 17 is configured to sequentially calculate selection evaluation standards of preset reference row indexes of the present coding block, the selection evaluation standard including, but not limited to, a rate distortion cost. The determination part 14 is further configured to determine a reference row index corresponding to a minimum selection evaluation standard from the preset reference row indexes as a first preset reference row index. The acquisition part 11 is further configured to acquire an MPM list construction rule corresponding to the first preset reference row index. The construction part 13 is further configured to construct the initial MPM list based on the MPM list construction rule.

Furthermore, in the embodiments of the disclosure, the device may further include the matching part 18 and the coding part 19.

The matching part 18 is configured to match an optimized prediction mode for the present coding block to the MPM list.

The coding part 19 is configured to, while matching succeeds, encode an index of the optimized prediction mode for the present coding block in the MPM list based on a context model, and while matching fails, encode the optimized prediction mode for the present coding block by use of a truncated binary code.

Furthermore, in the embodiments of the disclosure, the prediction mode list may include a chroma prediction mode list.

The construction part 13 is further configured to determine at least one of an angular intra prediction mode neighboring to the angular replacement prediction mode and an angular intra prediction mode opposite to the angular replacement prediction mode in direction as the adjusted angular replacement prediction mode and determine the adjusted angular replacement prediction mode as an alternative mode in an initial chroma prediction mode list to construct the chroma prediction mode list corresponding to the present coding block, the initial chroma prediction mode list being constructed according to a preset chroma intra prediction construction method, or, replace a DM in an initial chroma prediction mode list based on the adjusted angular replacement prediction mode to construct the chroma prediction mode list.

Furthermore, in the embodiments of the disclosure, the determination part 14 is further configured to determine an optimized prediction mode for the present coding block and derive a chroma intra prediction mode based on the optimized prediction mode.

The replacement part 16 is further configured to, when the chroma intra prediction mode meets a preset prediction mode in the initial chroma prediction mode list, replace the chroma intra prediction mode with the adjusted angular replacement prediction mode.

Furthermore, in the embodiments of the disclosure, the insertion part 15 is further configured to determine at least one of an angular intra prediction mode neighboring to the angular replacement prediction mode and an angular intra prediction mode opposite to the angular replacement prediction mode in direction as the adjusted angular replacement prediction mode and insert the adjusted angular replacement prediction mode prior to an existing angle fine-adjustment row in an initial MDMS list to construct an MDMS list, or, replace a DM in an initial MDMS list based on the adjusted angular replacement prediction mode to construct the MDMS list.

Figure 16:
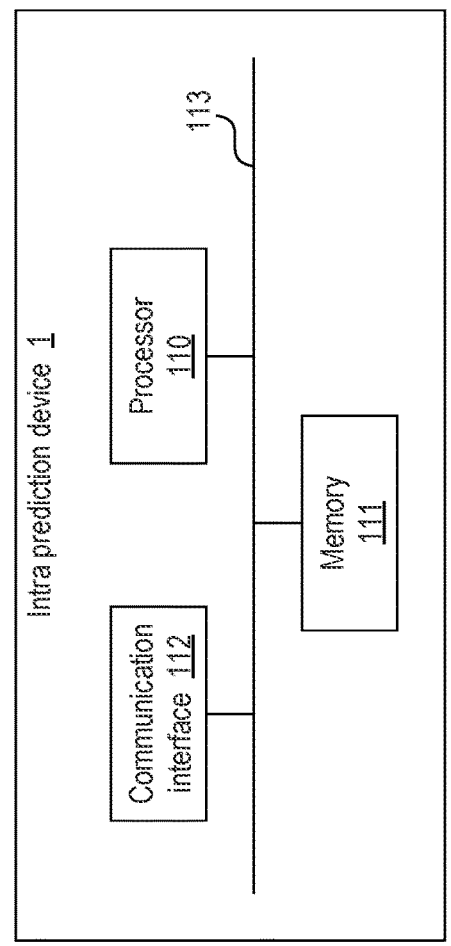
FIG. 16 is a second composition structure diagram of an intra prediction device according to an embodiment of the disclosure.

FIG. 16 is a second composition structure diagram of an intra prediction device according to an embodiment of the disclosure. As shown in FIG. 16, the intra prediction device 1 in the embodiments of the disclosure may also include a processor 110, a memory 111 storing instructions executable by the processor 110, a communication interface 112 and a bus 113 configured to connect the processor 110, the memory 111 and the communication interface 112.

In the embodiments of the disclosure, the processor 110 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing unit (CPU), a controller, a microcontroller and a microprocessor. It can be understood that, for different devices, other electronic components may be configured to realize functions of the processor, and no specific limits are made in the embodiments of the disclosure. The intra prediction device 1 may further include the memory 111. The memory 111 may be connected with the processor 110. The memory 111 is configured to store an executable program code. The program code includes a computer operation instruction. The memory 111 may include a high-speed Random Access Memory (RAM) and may also include a non-volatile memory, for example, at least two disk memories.

In the embodiments of the disclosure, the bus 113 is configured to connect the communication interface 112, the processor 110 and the memory 111 and implement communications between these devices.

In the embodiments of the disclosure, the memory 111 is configured to store an instruction and data.

Furthermore, in the embodiments of the disclosure, the processor 110 is configured to acquire a width-to-height radio of a present coding block and a width-to-height radio of a reference block, the reference block being a coding block correlated with the present coding block, when the width-to-height radio of the present coding block is different from the width-to-height radio of the reference block, adjust an angular replacement prediction mode corresponding to the reference block to obtain an adjusted angular replacement prediction mode, the angular replacement prediction mode being an extended angular prediction mode under a wide-angle mode, and construct a prediction mode list of the present coding block based on the adjusted angular replacement prediction mode for intra prediction of the present coding block.

During a practical disclosure, the memory 111 may be a first volatile memory such as a first RAM, or a first non-volatile memory such as a first Read-Only Memory (ROM), a first flash memory, a Hard Disk Drive (HDD) or a Solid-State Drive (SSD), or a combination of the first memories, and provides instructions and data for the processor 110.

In addition, each functional module in the embodiment may be integrated into a processing unit, each unit may also exist independently, and two or more than two units may also be integrated into a unit. The integrated unit may be implemented in a hardware form and may also be implemented in form of software function module.

When implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a ROM, a RAM, a magnetic disk or an optical disk.

The embodiment of the disclosure discloses the intra prediction device. The intra prediction device may acquires a width-to-height radio of a present coding block and a width-to-height radio of a reference block, the reference block being a coding block correlated with the present coding block; when the width-to-height radio of the present coding block is different from the width-to-height radio of the reference block, the intra prediction device may adjust the angular replacement prediction mode corresponding to the reference block to obtain an adjusted angular replacement prediction mode, the angular replacement prediction mode being an angular prediction mode extended in the wide-angle mode; and the intra prediction device may construct a prediction mode list of the present coding block based on the adjusted angular replacement prediction mode for intra prediction of the present coding block. It can be seen that, in the embodiments of the disclosure, when the intra prediction device determines that the width-to-height radio of the present coding block is different from the width-to-height radio of the reference block, the intra prediction device may adjust the angular replacement prediction mode for the reference block to a direction closest to a real prediction direction of a neighbouring adjustment unit in the same direction or adjust the angular replacement prediction mode to an opposite direction of the neighbouring adjustment unit at the same angle and add the adjusted angular replacement prediction mode to the MPM list, so that the accuracy of a prediction angle is further improved. When luma intra prediction is performed based on the MPM list, the intra prediction accuracy may be improved greatly and the encoding efficiency is further improved.

The embodiments of the disclosure provide a computer-readable storage medium, in which a computer program is stored. The computer program is executed by a processor to implement the intra prediction method.

Specifically, a program instruction corresponding to the picture prediction method in the embodiments may be stored in a storage medium such as an optical disk, a hard disk and a U disk. When the program instruction corresponding to the intra prediction method in the storage medium is read or executed by an electronic device, any abovementioned intra prediction method is implemented.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to implementation flowcharts and/or block diagrams of the method, device(system) and computer program product according to the embodiments of the disclosure. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the implementation flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the implementation flowcharts and/or one block or multiple blocks in the block diagrams.

These computer program instructions may further be loaded onto the computer or the other programmable data processing device, so that a series of operating operations are executed on the computer or the other programmable data processing device to generate processing implemented by the computer, and operations for realizing the function specified in one flow or multiple flows in the implementation flowcharts and/or one block or multiple blocks in the block diagrams are provided by the instructions executed on the computer or the other programmable data processing device.

The above is only the preferred embodiment of the disclosure and not intended to limit the scope of protection of the disclosure.

INDUSTRIAL APPLICABILITY

The embodiments of the disclosure provide an intra prediction method and device and a computer storage medium. The intra prediction device may acquire a width-to-height radio of a present coding block and a width-to-height radio of a reference block, the reference block being a coding block correlated with the present coding block; when the width-to-height radio of the present coding block is different from the width-to-height radio of the reference block, the intra prediction device may adjust an angular replacement prediction mode corresponding to the reference block to obtain an adjusted angular replacement prediction mode, the angular replacement prediction mode being an extended angular prediction mode under a wide-angle mode; and the intra prediction device may construct a prediction mode list of the present coding block based on the adjusted angular replacement prediction mode for intra prediction of the present coding block. It can be seen that, in the embodiments of the disclosure, when the intra prediction device determines that the width-to-height radio of the present coding block is different from the width-to-height radio of the reference block, the intra prediction device may adjust the angular replacement prediction mode for the reference block to a direction closest to a real prediction direction of a neighbouring adjustment unit in the same direction or to an opposite direction of the neighbouring adjustment unit at the same angle and add the adjusted angular replacement prediction mode to the MPM list, so that the accuracy of a prediction angle is further improved, and when luma intra prediction is performed based on the MPM list, the intra prediction accuracy may be improved greatly and the encoding efficiency is further improved.

The invention claimed is:

1. An intra prediction method, implemented by a decoder, comprising:
    decoding a bitstream and acquiring a width-to-height ratio of a present coding block;
    decoding the bitstream and acquiring a reference block correlated with the present coding block;
    obtaining a maximum angular prediction mode and a minimum angular prediction mode both corresponding to the present coding block, wherein the maximum and the minimum angular prediction modes correspond to a width and a height of the present coding block;
    adjusting an angular replacement prediction mode corresponding to the reference block based on the width-to-height ratio of the present coding block to obtain an adjusted angular replacement prediction mode without equalizing a distribution of the adjusted angular replacement prediction mode, wherein the adjusted angular replacement prediction mode is derived from the maximum angular prediction mode and the minimum angular prediction mode, wherein the maximum angular prediction mode and the minimum angular prediction mode are used as direct inputs to generate the adjusted angular replacement prediction mode, wherein the angular replacement prediction mode is adjusted to an angular intra prediction mode opposite to the angular replacement prediction mode at least based on the width-to-height ratio; and
    taking use of the adjusted angular replacement prediction mode for intra prediction of the present coding block.

2. The method of claim 1, wherein adjusting the angular replacement prediction mode corresponding to the reference block to obtain the adjusted angular replacement prediction mode comprises:
    adjusting the angular replacement prediction mode according to the maximum angular prediction mode and the minimum angular prediction mode.

3. An intra prediction method, implemented by an encoder, comprising:
    acquiring a width-to-height ratio of a present coding block;
    acquiring a reference block correlated with the present coding block;
    obtaining a maximum angular prediction mode and a minimum angular prediction mode both corresponding to the present coding block, wherein the maximum and the minimum angular prediction modes correspond to a width and a height of the present coding block;
    adjusting an angular replacement prediction mode corresponding to the reference block based on the width-to-height ratio of the present coding block to obtain an adjusted angular replacement prediction mode without equalizing a distribution of the adjusted angular replacement prediction mode, wherein the adjusted angular replacement prediction mode is derived from the maximum angular prediction mode and the minimum angular prediction mode, wherein the maximum angular prediction mode and the minimum angular prediction mode are used as direct inputs to generate the adjusted angular replacement prediction mode, wherein the angular replacement prediction mode is adjusted to an angular intra prediction mode opposite to the angular replacement prediction mode at least based on the width-to-height ratio; and taking use of the adjusted angular replacement prediction mode for intra prediction of the present coding block.

4. The method of claim 3, wherein adjusting the angular replacement prediction mode corresponding to the reference block to obtain the adjusted angular replacement prediction mode comprises:
adjusting the angular replacement prediction mode according to the maximum angular prediction mode and the minimum angular prediction mode.

5. A decoder, comprising: a processor, a memory storing instructions executable by the processor, a communication interface and a bus configured to connect the processor, the memory and the communication interface, wherein when the instructions are executed, the processor implements operations comprising:
decoding a bitstream and acquiring a width-to-height ratio of a present coding block;
decoding the bitstream and acquiring a reference block correlated with the present coding block;
obtaining a maximum angular prediction mode and a minimum angular prediction mode both corresponding to the present coding block, wherein the maximum and the minimum angular prediction modes correspond to a width and a height of the present coding block;
adjusting an angular replacement prediction mode corresponding to the reference block based on the width-to-height ratio of the present coding block to obtain an adjusted angular replacement prediction mode without equalizing a distribution of the adjusted angular replacement prediction mode, wherein the adjusted angular replacement prediction mode is derived from the maximum angular prediction mode and the minimum angular prediction mode, wherein the maximum angular prediction mode and the minimum angular prediction mode are used as direct inputs to generate the adjusted angular replacement prediction mode, wherein the angular replacement prediction mode is adjusted to an angular intra prediction mode opposite to the angular replacement prediction mode at least based on the width-to-height ratio; and
taking use of the adjusted angular replacement prediction mode for intra prediction of the present coding block.

6. The decoder of claim 5, wherein adjusting the angular replacement prediction mode corresponding to the reference block to obtain the adjusted angular replacement prediction mode comprises:
adjusting the angular replacement prediction mode according to the maximum angular prediction mode and the minimum angular prediction mode.

7. An encoder, comprising: a processor, a memory storing instructions executable by the processor, a communication interface and a bus configured to connect the processor, the memory and the communication interface, wherein when the instructions are executed, the processor implements operations comprising:
acquiring a width-to-height ratio of a present coding block;
acquiring a reference block correlated with the present coding block;
obtaining a maximum angular prediction mode and a minimum angular prediction mode both corresponding to the present coding block, wherein the maximum and the minimum angular prediction modes correspond to a width and a height of the present coding block;
adjusting an angular replacement prediction mode corresponding to the reference block based on the width-to-height ratio of the present coding block to obtain an adjusted angular replacement prediction mode without equalizing a distribution of the adjusted angular replacement prediction mode, wherein the adjusted angular replacement prediction mode is derived from the maximum angular prediction mode and the minimum angular prediction mode, wherein the maximum angular prediction mode and the minimum angular prediction mode are used as direct inputs to generate the adjusted angular replacement prediction mode, wherein the angular replacement prediction mode is adjusted to an angular intra prediction mode opposite to the angular replacement prediction mode at least based on the width-to-height ratio; and
taking use of the adjusted angular replacement prediction mode for intra prediction of the present coding block.

8. The encoder of claim 7, wherein adjusting the angular replacement prediction mode corresponding to the reference block to obtain the adjusted angular replacement prediction mode comprises:
adjusting the angular replacement prediction mode according to the maximum angular prediction mode and the minimum angular prediction mode.

9. The method of claim 1, wherein the direct inputs are for an equation to generate the adjusted angular replacement prediction mode, and wherein the equation includes:

$$dir_W = Clip(minMC, maxMC, dir),$$

wherein "dir_W" represents an angular intra prediction mode neighboring to the angular replacement prediction mode, "minMc" represents the minimum angular prediction mode, "maxMc" represents the maximum angular prediction mode, and "dir" represents the angular replacement prediction mode corresponding to the reference block.

10. The method of claim 3, wherein the direct inputs are for an equation to generate the adjusted angular replacement prediction mode, and wherein the equation includes:

$$dir_W = Clip(minMC, maxMC, dir),$$

wherein "dir_W" represents an angular intra prediction mode neighboring to the angular replacement prediction mode, "minMc" represents the minimum angular prediction mode, "maxMc" represents the maximum angular prediction mode, and "dir" represents the angular replacement prediction mode corresponding to the reference block.

11. The decoder of claim 5, wherein the direct inputs are for an equation to generate the adjusted angular replacement prediction mode, and wherein the equation includes:

$$dir_W = Clip(minMC, maxMC, dir),$$

wherein "dir_W" represents an angular intra prediction mode neighboring to the angular replacement prediction mode, "minMc" represents the minimum angular prediction mode, "maxMc" represents the maximum angular prediction mode, and "dir" represents the angular replacement prediction mode corresponding to the reference block.

12. The encoder of claim 7, wherein the direct inputs are for an equation to generate the adjusted angular replacement prediction mode, and wherein the equation includes:

$$dir_W = Clip(minMC, maxMC, dir),$$

wherein "dir_W" represents an angular intra prediction mode neighboring to the angular replacement prediction mode, "minMc" represents the minimum angular prediction mode, "maxMc" represents the maximum angular prediction mode, and "dir" represents the angular replacement prediction mode corresponding to the reference block.

* * * * *